US010279684B2

(12) United States Patent
Grider et al.

(10) Patent No.: US 10,279,684 B2
(45) Date of Patent: *May 7, 2019

(54) SYSTEM AND METHOD FOR CONTROLLING HEATING IN A HYBRID VEHICLE USING A POWER SOURCE EXTERNAL TO THE HYBRID VEHICLE

(75) Inventors: Duane M. Grider, Farmington Hills, MI (US); Bala S. Chander, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 2588 days.

This patent is subject to a terminal disclaimer.

(21) Appl. No.: 12/329,707

(22) Filed: Dec. 8, 2008

(65) Prior Publication Data

US 2010/0140246 A1 Jun. 10, 2010

(51) Int. Cl.
*B60L 1/02* (2006.01)
*H05B 3/02* (2006.01)
(Continued)

(52) U.S. Cl.
CPC .................. *B60L 1/02* (2013.01); *B60K 6/48* (2013.01); *B60L 1/04* (2013.01); *B60L 11/187* (2013.01);
(Continued)

(58) Field of Classification Search
CPC ... B60K 2001/008; B60K 6/48; B60L 11/187; B60L 11/1887; B60L 1/04; B60L 2240/34; B60L 2240/423; B60L 2240/445; B60L 2260/56; B60W 10/26; B60W 20/00; B60W 2510/0676; B60W 2510/244; B60W 2510/246; B60W 2710/083;
(Continued)

(56) References Cited

U.S. PATENT DOCUMENTS 3,270,267 A 7/1965 Nolte, Jr.
3,673,379 A 6/1972 Eversull
(Continued)

FOREIGN PATENT DOCUMENTS

| JP | 5256208 | 10/1993 |
| JP | 2001268715 | 9/2001 |
| JP | 2006238543 | 9/2006 |

OTHER PUBLICATIONS

Office Action filed in U.S. Appl. No. 12/329,711 dated Dec. 31, 2012.

*Primary Examiner* — Sang Y Paik
(74) *Attorney, Agent, or Firm* — David B. Kelley; Brooks Kushman P.C.

(57) ABSTRACT

A system and method for controlling heating of at least one of an engine and a battery in a hybrid vehicle includes at least one heater and at least one system controller. The system controller receives a command signal and generates a heater control signal based on the command signal. The heater is in the hybrid vehicle and is electrically coupled to an electrical port integrated in the hybrid vehicle. The electrical port receives electric power from a power source external to the hybrid vehicle. In addition, the system includes a heater switch. The heater switch receives the heater control signal to control an amount of energy transferred from the electrical port to the heater and the heater selectively heats at least one of the engine and the battery in the hybrid vehicle.

16 Claims, 8 Drawing Sheets

(51) Int. Cl.
  *B23K 13/08* (2006.01)
  *B60K 6/48* (2007.10)
  *B60L 1/04* (2006.01)
  *B60L 11/18* (2006.01)
  *B60W 10/26* (2006.01)
  *B60W 20/00* (2016.01)
  *B60K 1/00* (2006.01)

(52) U.S. Cl.
  CPC .......... *B60L 11/1887* (2013.01); *B60W 10/26* (2013.01); *B60W 20/00* (2013.01); *B60K 2001/008* (2013.01); *B60L 2240/34* (2013.01); *B60L 2240/423* (2013.01); *B60L 2240/445* (2013.01); *B60L 2260/56* (2013.01); *B60W 2510/0676* (2013.01); *B60W 2510/244* (2013.01); *B60W 2510/246* (2013.01); *B60W 2710/083* (2013.01); *Y02T 10/6221* (2013.01); *Y02T 10/6269* (2013.01); *Y02T 10/642* (2013.01); *Y02T 10/705* (2013.01); *Y02T 10/7011* (2013.01); *Y02T 10/7016* (2013.01); *Y02T 90/34* (2013.01)

(58) Field of Classification Search
  CPC ............. Y02T 10/6221; Y02T 10/6269; Y02T 10/642; Y02T 10/7011; Y02T 10/7016; Y02T 10/705; Y02T 90/34
  USPC .......................... 219/202, 205, 219, 472–480
  See application file for complete search history.

(56) References Cited

U.S. PATENT DOCUMENTS

| | | | |
|---|---|---|---|
| 3,744,046 A | 7/1973 | Tamasi | |
| 3,859,899 A | 1/1975 | Mills | |
| 4,002,882 A | 1/1977 | McCutchen | |
| 4,678,998 A * | 7/1987 | Muramatsu | G01R 31/3662 320/136 |
| 4,825,039 A | 4/1989 | Yoo | |
| 4,842,108 A | 6/1989 | Anderson et al. | |
| 4,895,542 A | 1/1990 | de Blanitza | |
| 4,916,430 A | 4/1990 | Vu et al. | |
| 5,012,070 A | 4/1991 | Reed | |
| 5,115,116 A | 5/1992 | Reed | |
| 5,210,393 A | 5/1993 | Shier | |
| 5,212,347 A | 5/1993 | Powers et al. | |
| 5,230,552 A | 7/1993 | Schipper et al. | |
| 5,251,588 A | 10/1993 | Tsujii et al. | |
| 5,280,158 A * | 1/1994 | Matava et al. | 219/492 |
| 5,281,792 A | 1/1994 | Lee et al. | |
| 5,317,108 A | 5/1994 | Prairie, Jr. | |
| 5,344,330 A | 9/1994 | Hoffman | |
| 5,344,331 A | 9/1994 | Hoffman et al. | |
| 5,457,378 A | 10/1995 | Woody | |
| 5,565,755 A | 10/1996 | Keith | |
| 5,642,236 A | 6/1997 | Mazurek | |
| 5,757,595 A | 5/1998 | Ozawa et al. | |
| 5,803,216 A | 9/1998 | McNaught | |
| 5,831,244 A | 11/1998 | Springer, Jr. | |
| 5,889,624 A | 3/1999 | Dickenson | |
| 5,993,226 A | 11/1999 | Yamaguchi | |
| 5,994,669 A | 11/1999 | McCall | |
| 6,086,229 A | 7/2000 | Pastrick | |
| 6,149,287 A | 11/2000 | Pastrick et al. | |
| 6,157,162 A | 12/2000 | Hayashi et al. | |
| 6,200,160 B1 | 3/2001 | Drexler et al. | |
| 6,225,893 B1 | 5/2001 | Caissie | |
| 6,232,577 B1 | 5/2001 | Reiff | |
| 6,250,783 B1 | 6/2001 | Stidham et al. | |
| 6,253,866 B1 | 7/2001 | Kojima | |
| 6,253,956 B1 | 7/2001 | Kahn et al. | |
| 6,264,016 B1 | 7/2001 | Bales | |
| 6,276,821 B1 | 8/2001 | Pastrick et al. | |
| 6,320,351 B1 * | 11/2001 | Ng | H02J 7/0032 320/104 |
| 6,351,098 B1 | 2/2002 | Kaneko | |
| 6,459,234 B2 | 10/2002 | Kajiura | |
| 6,496,575 B1 * | 12/2002 | Vasell et al. | 379/102.05 |
| 6,630,813 B2 | 10/2003 | Berels et al. | |
| 6,811,288 B2 | 11/2004 | Hutzel | |
| 6,854,575 B1 | 2/2005 | Desormeaux et al. | |
| 7,022,943 B2 | 4/2006 | Barta | |
| 7,127,965 B2 | 10/2006 | Chuang | |
| 7,216,996 B2 | 5/2007 | Rehill | |
| 7,309,834 B1 | 12/2007 | Byrd | |
| 7,597,552 B2 | 10/2009 | Young et al. | |
| 7,618,169 B1 | 11/2009 | Lee | |
| 8,011,704 B2 | 9/2011 | Nees et al. | |
| 8,125,180 B2 * | 2/2012 | Grider et al. | 320/104 |
| 2001/0013702 A1 | 8/2001 | Yanase et al. | |
| 2002/0070872 A1 | 6/2002 | Deline et al. | |
| 2002/0072026 A1 | 6/2002 | Lynam et al. | |
| 2003/0031023 A1 | 2/2003 | Hutzel | |
| 2004/0036601 A1 * | 2/2004 | Obradovich | 340/540 |
| 2004/0190303 A1 | 9/2004 | Mishimagi | |
| 2005/0141111 A1 | 6/2005 | Yoshida | |
| 2005/0243449 A1 | 11/2005 | Pavao | |
| 2006/0016793 A1 | 1/2006 | Zhu et al. | |
| 2007/0086097 A1 | 4/2007 | Motomiya et al. | |
| 2008/0129475 A1 | 6/2008 | Breed et al. | |
| 2008/0203966 A1 | 8/2008 | Ward | |
| 2008/0273715 A1 | 11/2008 | Snider et al. | |
| 2008/0277950 A1 | 11/2008 | Nees et al. | |
| 2009/0230783 A1 | 9/2009 | Weed et al. | |
| 2010/0140246 A1 | 6/2010 | Grider et al. | |
| 2011/0127947 A1 | 6/2011 | Hunter et al. | |
| 2011/0168687 A1 | 7/2011 | Door et al. | |

* cited by examiner

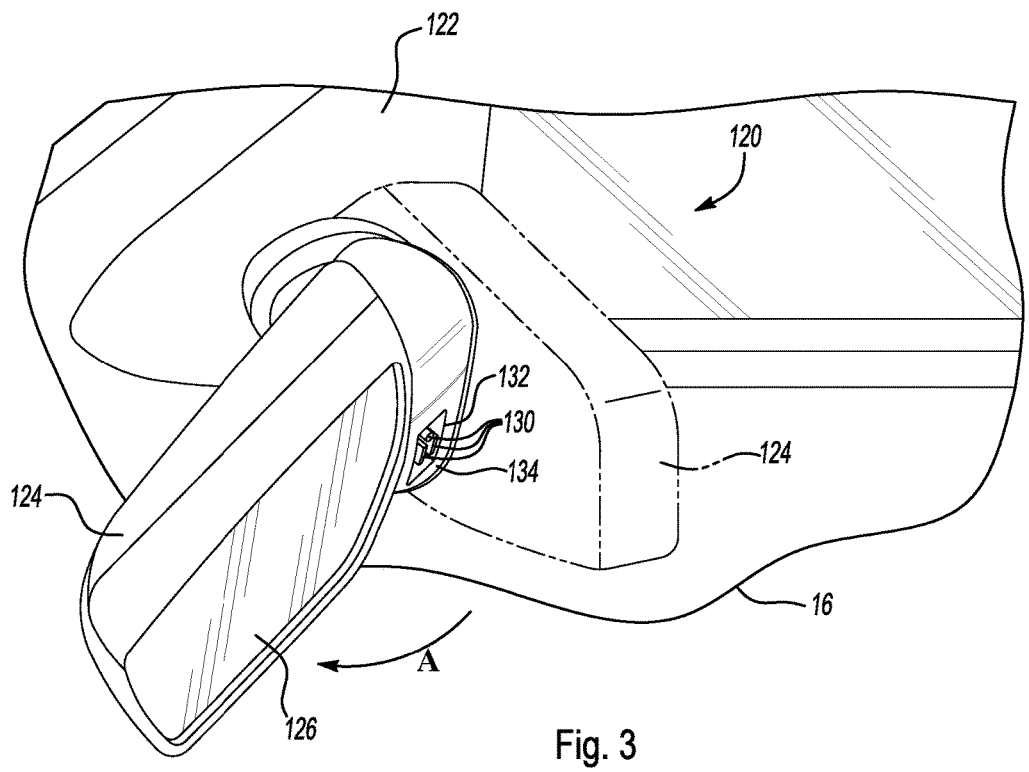
Fig. 3
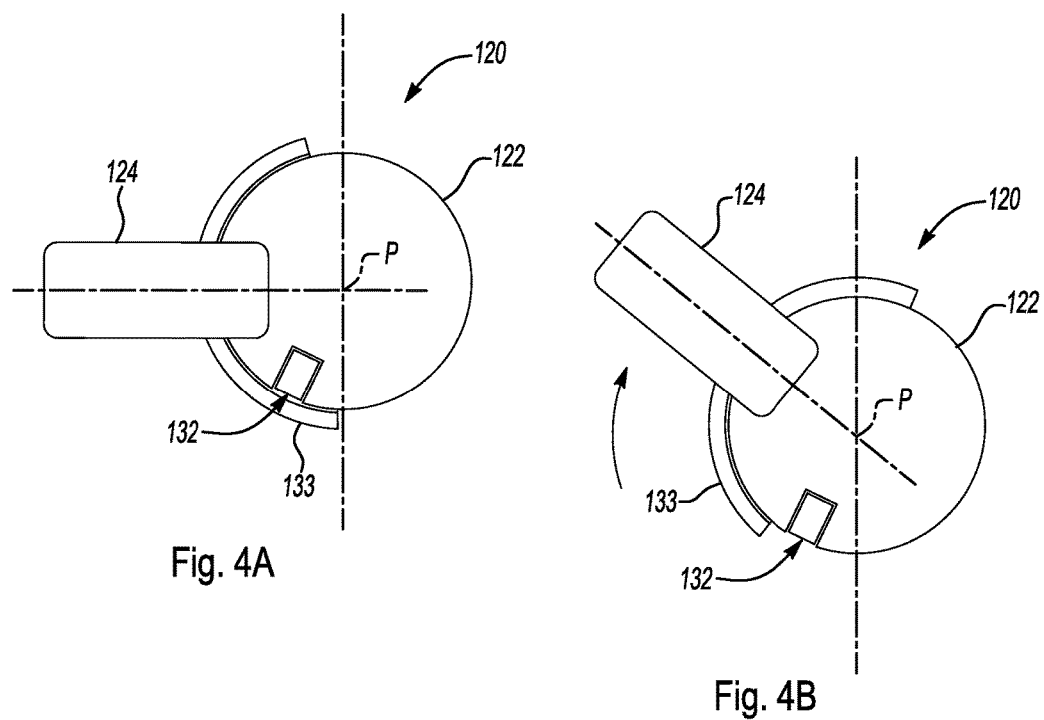
Fig. 4A
Fig. 4B

SYSTEM AND METHOD FOR CONTROLLING HEATING IN A HYBRID VEHICLE USING A POWER SOURCE EXTERNAL TO THE HYBRID VEHICLE

CROSS-REFERENCE TO RELATED APPLICATION

U.S. patent application entitled "INTEGRATED SIDE VIEW MIRROR ASSEMBLY AND ELECTRICAL PORT FOR AN AUTOMOTIVE VEHICLE" filed on May 12, 2008 and having application Ser. No. 12/119,074, issued on Feb. 28, 2012 as U.S. Pat. No. 8,125,180, is related to this application.

BACKGROUND

1. Technical Field

The present invention relates to a system and method for controlling heating of at least one of an engine and a battery in a hybrid vehicle using a source of power external to the hybrid vehicle.

2. Background Art

A hybrid vehicle is a type of automotive vehicle that uses power from more than one energy source to propel the vehicle.

A plug-in hybrid electric vehicle (PHEV) is a type of hybrid vehicle that uses one or more rechargeable electric batteries. An electrical battery of the PHEV can be charged using an electric power source that is external to the PHEV. Typically a plug connection is used between the electric battery and the external electric power source to charge the electric battery. Energy stored in the electric battery of the PHEV can be used to propel the vehicle.

A PHEV typically has an internal combustion engine and an electric motor. Both the internal combustion engine and the electric motor may be used to propel the PHEV. The electric motor can be used to propel the PHEV without power from the internal combustion engine. Alternatively, the internal combustion engine can be used to propel the PHEV without power from the electric motor. In addition, the internal combustion engine and the electric motor may be used to propel the PHEV simultaneously. When the electric motor propels the PHEV, the electric motor draws power from the rechargeable electric battery.

A hybrid electric vehicle (HEV) consumes petroleum-based fuel most efficiently, and achieves the best petroleum-based fuel economy during a given driving cycle when the internal combustion engine is shut off during a portion of the cycle and the electric motor uses power from the electric battery to propel the HEV. In addition, the HEV achieves the lowest tailpipe emissions during a given driving cycle when the internal combustion engine is shut off during a portion of the cycle and the electric motor uses power from the electric battery to propel the vehicle.

There exists a need to reduce the amount of petroleum-based fuel that an internal combustion engine in a hybrid vehicle consumes during a given driving cycle. Reducing the amount of petroleum-based fuel that the automotive vehicle consumes may result in reduced tailpipe emissions as well as the cost of operation.

SUMMARY

In one embodiment, a system for controlling heating of at least one of an engine and a battery in a hybrid vehicle is provided. The system uses a power source external to the hybrid vehicle for heating. The system includes an electrical port integrated in the hybrid vehicle for receiving electric power from the power source. In addition, the system has an engine heater and a battery heater in the hybrid vehicle. The engine heater and the battery heater are electrically coupled to the electrical port. The engine heater is configured to heat the engine and the battery heater is configured to heat the battery. Furthermore, the system includes a system controller and at least one heater switch in the hybrid vehicle. The system controller is configured to receive a command signal and generate at least one heater control signal based on the command signal. The heater switch is configured to receive the heater control signal to control an amount of energy transferred from the electrical port to at least one of the engine heater and the battery heater.

In another embodiment, a system for controlling heating of at least one of an engine and a battery in a hybrid electric vehicle using a power source external to the vehicle is provided. The system has at least one heater and an electrical port integrated in the hybrid vehicle. The electrical port is configured to receive electric power from the power source. The heater is electrically coupled to the electrical port and is configured to heat at least one of the engine and the battery. In addition, the system includes a temperature sensor and a system controller in the hybrid electric vehicle. The system controller is configured to receive a command signal and a feedback signal and generate at least one heater control signal based on the command signal and the feedback signal. Furthermore, the system has a heater switch configured to receive the heater control signal to control an amount of energy transferred from the power source to the heater. The heater can heat at least one of the engine and the battery to a predetermined temperature and maintain at least one of the engine and the battery within a predetermined temperature range. In addition, the system includes at least one of an engine controller and a battery controller configured to receive a temperature signal from the temperature sensor and generate the feedback signal based on the temperature signal.

In another embodiment, a method of controlling heating of at least one of the engine and the battery in an automotive vehicle is provided. The method includes receiving the command signal and a feedback signal, and generating a heater control signal based on the command signal and the feedback signal. The method further includes receiving an amount of energy from the power source external to the automotive vehicle and controlling the amount of energy transferred from the power source to the heater in the automotive vehicle. The method further includes heating at least one of the engine and the battery in the vehicle, sensing a temperature, and transmitting the feedback signal based on the temperature.

BRIEF DESCRIPTION OF THE DRAWINGS

FIG. 3 is a fragmentary side perspective view illustrating a mirror housing of a side view mirror assembly rotated between one position concealing an electrical port and another position exposing the electrical port;

FIG. 4A is a top plan view of the side view mirror assembly having a base closure concealing the electrical port in a recess of a base of the mirror assembly;

FIG. 4B is a top plan view of the side view mirror assembly having the base closure rotated from its position in FIG. 4A to expose the electrical port;

DETAILED DESCRIPTION

Aspects of the present invention as set forth in FIGS. 1-10 may generally illustrate and describe a controller (or module), or other such electrically based components. Each reference to a controller and electrically based component, and the functionality provided for each, is not intended to be limited to encompassing only what is illustrated and described herein. While a particular label may be assigned to a controller and/or electric component disclosed, the label is not intended to limit the scope of operation of the controller and/or electric component. The controller may be combined with another controller and/or separated in any manner based on the particular type of electric architecture that is desired or intended to be implemented in the vehicle.

Figure 1:
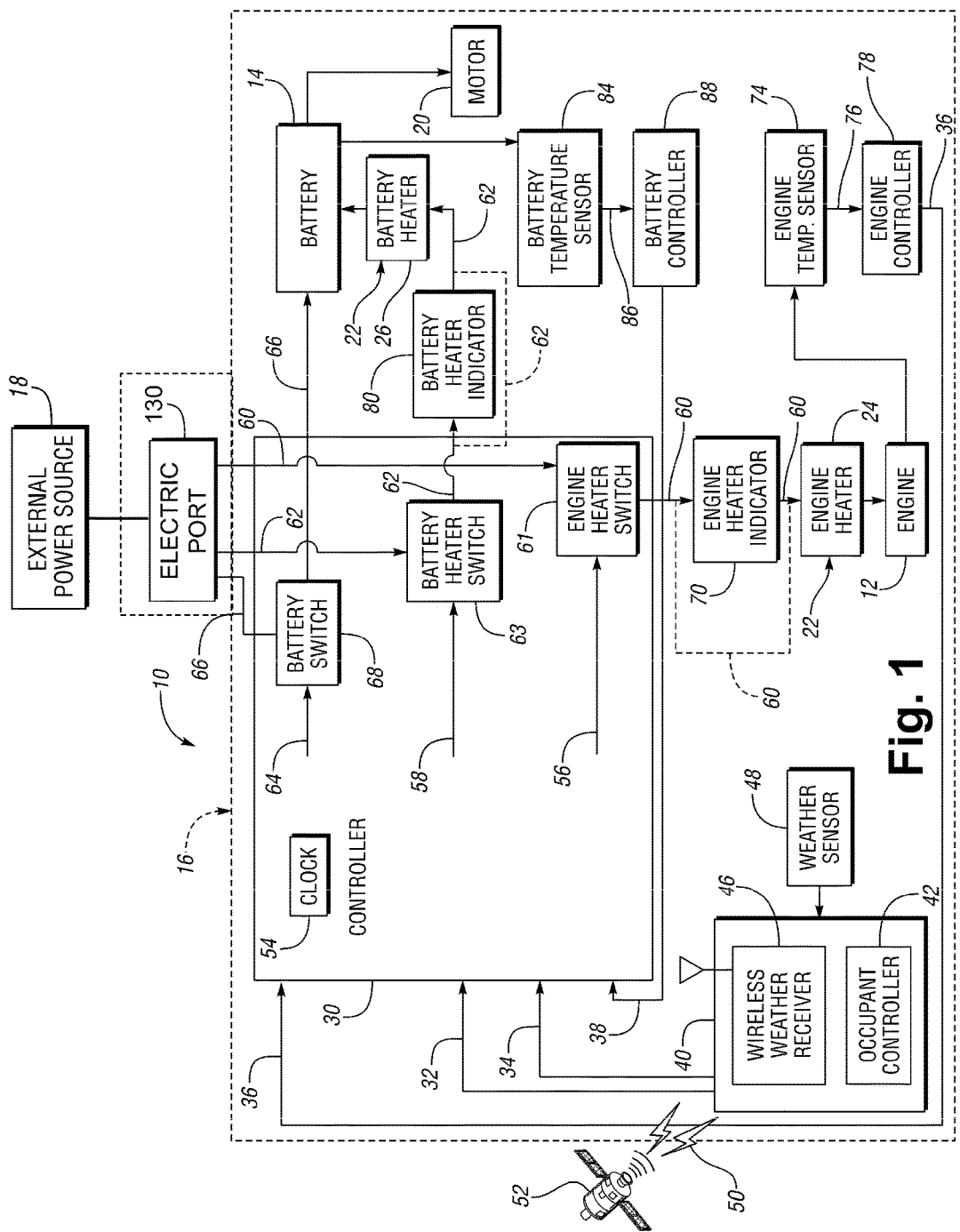
FIG. 1 is a schematic diagram illustrating a system having at least one heater and at least one system controller for controlling heating of at least one of an engine and a battery in an automotive vehicle using a power source external to the vehicle.

With reference to FIG. 1, a system 10 for controlling heating of at least one of an engine 12 and a battery 14 in an automotive vehicle 16 is provided. Furthermore, the system 10 may be used to heat both the engine 12 and the battery 14. In addition, the automotive vehicle 16 may be a hybrid electric vehicle (HEV) or a plug-in hybrid electric vehicle (PHEV) where "plugging-in" the PHEV into an electrical outlet recharges the battery 14 of the PHEV. The system 10 may also be part of a different type of automotive vehicle 16. The system 10 and its method of operation are described in an integrated manner to facilitate understanding of various aspects of the invention.

The system 10 for controlling heating of at least one of the engine 12, the battery 14, or the engine 12 and the battery 14 may be used in an effort to obtain the most efficient or optimum use of energy stored in the automotive vehicle 16. For example, the system 10 may be used to reduce tailpipe emissions, the cost of operating the vehicle 16, as well as an amount of petroleum-based fuel that the engine 12 in the automotive vehicle 16 consumes during a given driving cycle. In addition, the system 10 may be used to improve the energy efficiency of the vehicle 16.

The engine 12 may be an internal combustion engine that uses petroleum-based fuel. For example, the internal combustion engine may be a gasoline engine or a diesel engine. Alternatively, the internal combustion engine may be an engine that uses a different type of fuel such as biofuel, coal-based fuel, hydrogen, or other suitable fuel for powering the engine of the automotive vehicle 16.

The engine 12 may be fuel-cell powered, turbine-engine powered, or any type of engine that can be used to provide motive power to propel the automotive vehicle 16.

The battery 14 in the automotive vehicle 16 provides power to propel the vehicle 16. For example, the battery 14 can be used to power an electric motor 20 that can be used to propel the automotive vehicle 16. The battery 14 may be a rechargeable electric battery that charges using an electric power source 18 that is external to the vehicle 16. In addition, the battery 14 may include a plurality of electochemical cells, such as lithium-ion cells, lead acid cells, nickel metal hydride cells, or any other type of electrochemical cells that convert chemical, nuclear, solar, or thermal energy into electrical energy.

The power source 18 may be an alternating current (AC) power source or a direct current (DC) power source. The AC power source may be part of a standard 120-volt, 240-volt, or other suitable AC power source. Furthermore, the power source 18 may also be an electric battery that is external to the vehicle 16.

An electrical port 130 (generally illustrated in FIGS. 3-6A and FIGS. 6C-9) and may be used between the automotive vehicle 16 and the power source 18 to allow the battery 14 of the automotive vehicle 16 to be connected to and disconnected from the power source 18. The electrical port 130 may be part of a plug connection. For example, the plug connection may be a conventional three-pronged plug. Furthermore, the electrical port 130 may be part of an integrated side view mirror assembly as further described below.

The engine 12, the electric motor 20, or the engine 12 and the electric motor 20 may be used to propel the automotive vehicle 16. It should be understood that the electric motor 20 may include multiple electric motors or a motor/generator combination (not illustrated) to propel the automotive vehicle 16. The electric motor 20 can be used to propel the automotive vehicle 16 without power from the engine 12. When the electric motor 20 propels the vehicle 16, the electric motor 20 draws electric power from the battery 14.

The engine 12 may achieve the best petroleum-based fuel economy during a given driving cycle when the engine 12 is not operated during a portion of the cycle and the electric motor 20 uses power from the battery 14 to propel the automotive vehicle 16. When the engine 12 is not operated or is operated at a low energy consumption state, the engine 12 may consume no fuel or very little fuel. Using the electric motor 20 and not the engine 12 may allow the vehicle 16 to reduce an amount of petroleum-based fuel that the engine 12 consumes and enhance the petroleum-based fuel economy of the automotive vehicle 16.

The use of fuel to heat the engine 12 of the automotive vehicle 16 may not be as efficient as using the power source 18 external to the automotive vehicle 16 to heat the engine 12. Typically, the cost of the electric energy from the plug is lower than the cost of the energy of the fuel to power the engine 12. This may be especially true when factoring the efficiency of converting fuel into power for the engine 12.

Heating the engine 12 provides a number of benefits. Heating the engine 12 can reduce or eliminate the amount of time that the engine 12 needs to operate during a warm up cycle. Reducing the amount of time that the engine 12 operates can enhance the petroleum-based fuel economy of the vehicle 16 and reduce the amount of wear and fatigue on the engine 12. Furthermore, heating the engine 12 can reduce the amount of fuel needed to start the engine 12 compared to the amount of fuel needed to start an unheated or "cold" engine, such as during a "cold start." In addition, heating the engine 12 may reduce the tailpipe emissions of the vehicle 16, such as during the "cold start" of the engine 12. The colder the start temperature of the engine 12, the more time is required to heat the engine 12.

Heating the engine 12 can occur prior to starting the engine 12, such as during the "cold start." In addition, heating the engine 12 can occur subsequent to starting the engine 12. For example, the engine 12 of the automotive vehicle 16 be may heated to a predetermined running temperature before the engine 12 is shut off to allow the electric motor 20 to propel the automotive vehicle 16.

Heating the battery 14 can provide a number of benefits. For example, heating the battery 14 may increase the charging capacity of the battery 14 from the power source 18. Increasing the charging capacity of the battery 14 can allow the battery 14 to store more electric energy and be more fully charged. Furthermore, a more fully-charged battery can enhance the petroleum-based fuel economy of the automotive vehicle 16 since energy from the battery can be used for a longer period of time to propel the automotive vehicle 16 before the battery 14 runs out of energy. Once the battery 14 is depleted of energy, the engine 12 can consume fuel to power the automotive vehicle 16, thus reducing the petroleum-based fuel economy of the automotive vehicle 16. Heating the battery 14 can also provide other benefits.

The system 10 for controlling heating of the at least one of the engine 12 and the battery 14 includes at least one heater 22 and at least one system controller 30. The heater 22 may include an engine heater 24 to heat the engine 12. In addition, the heater 22 may include a battery heater 26 to heat the battery 14. Furthermore, the heater 22 of the system 10 is configured to be coupled to the power source 18. The electric power source 18 is external to the automotive vehicle 16.

The engine heater 24 may be any type of heater suitable for heating the engine 12. Furthermore, the engine heater 24 may be configured to provide 400-2000 watts of power to heat the engine 12, or any other suitable wattage. The engine heater 24 may have one or more electrical heating elements (not shown) that convert power received from the power source 18 into heat. The heating elements may be made of wire or ribbon of a Nichrome material, or other suitable material. Furthermore, the engine heater 24 may be a freeze-plug heater (not shown). The freeze-plug heater is a type of block heater that may be mounted in a core plug or freeze plug of an engine block of the engine 12. In addition, the engine heater 24 may be a heater that heats a fluid flowing through a heat exchanger of the engine 12. For example, the fluid may be an engine "coolant" flowing through a radiator (not shown) of the engine 12, such as through a lower radiator hose connected to the radiator.

The battery heater 26 may be any type of heater suitable for heating the battery 14. The battery heater 26 may include one or more electrical heating elements (not shown) that convert power received from the power source 18 into heat. For example, the battery heater 26 may have electrical heating elements attached to or integral with a flexible blanket surrounding at least a portion of the battery 14. In another example, the battery heater 26 may have electrical heating elements connected to a flat plate of the battery 14. In yet another example, the battery heater 26 may have electrical heating elements attached to or integral with one or more structures or enclosed components of the battery 14. For example, the electrical heating elements may be attached to or integral with a plurality of cells or modules of battery 14. In addition, the electrical heating elements may be attached to or integral with a ventilation system or a cooling system (not shown) of the battery 14. Other heating devices and configurations may implement the battery heater 26.

When the automotive vehicle 16 is stationary, the heater 22 may be electrically coupled to the power source 18 and use electric energy from the power source 18 to heat either the engine 12, the battery 14, or the engine 12 and the battery 14. The heater 22 may be electrically coupled to the power source 18 through the electrical port 130. In addition, the electrical port 130 may include one or more electrical inputs for receiving electric power from the power source 18. The electrical port 130 may be part of a plug connection. Furthermore, the electrical port 130 may be associated with a side view mirror assembly 120 (generally illustrated in FIGS. 2-9) of the automotive vehicle 16 as further described below.

With continuing reference to FIG. 1, the heater 22 uses energy from the power source 18 to heat either the engine 12, the battery 14, or the engine 12 and the battery 14. For example, the battery heater 26 may heat the battery 14, and the engine heater 24 may heat the engine 12.

As illustrated in FIG. 1, the system 10 has the system controller 30 configured to receive a command signal 32. The command signal 32 may have user setting information, weather information, and/or predetermined amount of time information. In addition, the system controller 30 may be configured to receive a demand signal 34, an engine feedback signal 36, and a battery feedback signal 38. The information from signals 32, 34, 36, and 38 may determine when the heater 22 heats, how long the heater 22 heats in a heating cycle, the rate the heater 22 heats, as well as other information as discussed below.

The system 10 may include an input controller 40. The input controller 40 may include an occupant controller 42 as well as a wireless weather receiver 46. Alternatively, the occupant controller 42 and/or the wireless weather receiver 46 may be located outside the input controller 40.

The occupant controller 42 may be used to allow an occupant of the automotive vehicle 16 to set or configure heating of the engine 12 and/or the battery 14 as well as charging of the battery 14. In addition, the occupant controller 42 may include a switch or an electronic display interface (not shown) in a passenger compartment of the vehicle 16 to allow a user of the vehicle 16 to set or configure the occupant controller 42. The occupant controller 42 may transmit the demand signal 34 having information used to control charging of the battery 14. In addition, the occupant controller 42 may transmit the command signal 32 having the user setting information indicating the setting or configuration of the occupant controller 42 to the system controller 30.

The user setting information may be dependant on how the user of the automotive vehicle 16 sets or configures the occupant controller 42. For example, the user setting information may include how long the at least one heater 22 should heat, at what rate the heater 22 should heat, when the heater 22 should heat, and/or to what temperature the heater 22 should heat the engine 12, the battery 14, or the engine 12 and the battery 14. In addition, the user setting information may include information indicating that the heater 22 should heat when a key is inserted into an ignition (not illustrated) of the vehicle 16. Furthermore, user setting information may include information indicating that the heater 22 should heat when the occupant of the vehicle 16 sets the occupant controller 42 to a heat-on mode to heat the engine 12, the battery 14, or the engine 12 and the battery 14.

The system 10 may include a weather sensor 48 in the automotive vehicle 16. Either the weather sensor 48, the wireless weather receiver 46, or the weather sensor 48 and the wireless weather receiver 46 may provide weather information. The wireless weather receiver 46 may be contained within the input controller 40 as illustrated in FIG. 1. Alternatively, the wireless weather receiver 46 may be contained outside the input controller 40. The wireless weather receiver 46 may be configured to receive a wireless signal 50 having weather information from a satellite 52. Furthermore, the wireless weather receiver 46 may be configured to receive the electromagnetic signal 50 from a radio frequency transmitter on an antenna tower (not shown).

Weather information includes temperature information indicating the temperature of the automotive vehicle 16 as sensed by the weather sensor 48. Furthermore, weather information may include temperature information indicating the temperature of the engine 12 and/or the battery 14 either prior to starting the engine 12 or during operation of the engine 12. Alternatively, the wireless weather receiver 46 may provide weather information that is real-time or forecasted weather temperature information of a particular area where the vehicle 16 is located. The weather temperature information of the particular area may used to provide an approximate temperature of the engine 12 and/or the battery 14.

The system controller 30 may include a clock 54 to measure a time interval from when the system controller 30 receives a signal to when the system controller 30 should generate a signal. The command signal 32, the demand signal 34, the engine feedback signal 36, and/or the battery feedback signal 38 may have the predetermined amount of time information.

The system controller 30 may use the predetermined amount of time information for many controller operations. For example, the system controller 30 may use the time information and the weather information to determine when the heater 22 should heat and/or at what rate the heater 22 should heat. The time information may indicate an intended use time indicating when a user intends to use the vehicle 16. In addition, the user may desire the engine 12 and/or the battery 14 to be sufficiently heated at or before the intended use time. In another example, the system controller 30 may use the time information and the weather information to determine that the heater 22 should heat at a particular time of day prior to the intended use time of day such that the engine 12 and/or the battery 14 are sufficiently heated prior to the intended use time. More specifically, the heater 22 may heat at a particular time of day of 6:55 a.m. prior to an intended use time of day of 7:00 a.m. such that the engine 12 and/or the battery 14 are sufficiently heated prior to 7:00 a.m. The heater 22 may heat for five minutes if the weather information indicates a very cold temperature. If the weather information indicates a relatively warmer temperature, then the heater 22 may heat for one minute. For example, the heater 22 may heat at a particular time of day of 6:59 a.m. prior to an intended use time of day of 7:00 a.m., such that the engine 12 and/or the battery 14 are sufficiently heated prior to 7:00 a.m.

Referring to FIG. 1, the system controller 30 receives the command signal 32 and generates an engine heater control signal 56 and/or a battery heater control signal 58 based on the command signal 32. The system controller 30 may use the user setting information, the weather information, and/or the predetermined amount of time information of the command signal 32, the demand signal 34, the engine feedback signal 36, and/or the battery feedback signal 38 to generate the heater control signals 56, 58.

With continuing reference to FIG. 1, the system controller 30 may use the engine feedback signal 36 to generate the engine heater control signal 56. The system controller 30 may generate the engine heater control signal 56 to heat the engine 12 of the automotive vehicle 16 within a predetermined temperature range based on the engine feedback signal 36. Furthermore, the system controller 30 may generate the engine heater control signal 56 to heat the engine 12 of the automotive vehicle 16 to a predetermined temperature based on the engine feedback signal 36. In addition, the system controller 30 may generate the engine heater control signal 56 to maintain the engine 12 of the vehicle 16 within a predetermined temperature range based on the engine feedback signal 36.

With continuing reference to FIG. 1, the system controller 30 may use the battery feedback signal 38 to generate the battery heater control signal 58. The system controller 30 may generate the battery heater control signal 58 to heat the battery 14 of the automotive vehicle 16 within a predetermined temperature range based on the battery feedback signal 38. Furthermore, the system controller 30 may generate the battery heater control signal 58 to heat the battery 14 of the automotive vehicle 16 to a predetermined temperature based on the battery feedback signal 38. In addition, the system controller 30 may generate the battery heater control signal 58 to maintain the battery 14 within a predetermined temperature range based on the battery feedback signal 38.

The engine heater control signal 56 may control a first amount 60 of energy transferred from the power source 18 to the engine heater 24. The system controller 30 may use the predetermined amount of time information to generate the engine heater control signal 56 after a predetermined amount of time has lapsed. For example, the system controller 30 may generate the engine heater control signal 56 to stop heating the engine 12 after the clock 54 measures a certain amount of time. Furthermore, the system controller 30 may generate the engine heater control signal 56 to start heating the engine 12 after the clock 54 measures a particular amount of time.

In addition, the system controller 30 may use the user setting information, the weather information, and/or the predetermined amount of time information of the command signal 32, the demand signal 34, the engine feedback signal 36, and/or the battery feedback signal 38 to generate the battery heater control signal 58.

The battery heater control signal 58 may control a second amount 62 of energy transferred from the power source 18 to the battery 14. The system controller 30 may use the predetermined amount of time information to generate the battery heater control signal 58 after a predetermined amount of time has lapsed. For example, the system controller 30 may generate the battery heater control signal 58 to stop heating the battery 14 after the clock 54 measures a certain amount of time. Furthermore, the system controller 30 may generate the battery heater control signal 58 to start heating the battery 14 after the clock 54 measures a particular amount of time.

With continuing reference to FIG. 1, the system controller 30 may be configured to receive the engine feedback signal 36. The engine feedback signal 36 may include various engine information such as how the engine 12 is operating as well as operating conditions of the engine 12. The engine feedback signal 36 may have temperature, heat, speed, fuel-supply, and operation time information of the engine 12. Based on the engine feedback signal 36 and/or the command signal 32, the system controller 30 may generate the engine heater control signal 56.

With continuing reference to FIG. 1, the system controller 30 may be configured to receive the battery feedback signal 38. The battery feedback signal 38 may include various battery information such as the amount of charge in the battery 14 and under what conditions the battery 14 is operating. In addition, the battery feedback signal 38 may have temperature, heat, charge, and battery-life information of the battery 14. Based on the battery feedback signal 38 and/or the command signal 32, the system controller 30 may generate the battery heater control signal 58.

As shown in FIG. 1, the system controller 30 may have at least one heater switch. The heater switch may include an engine heater switch 61, a battery heater switch 63, or the engine heater switch 61 and the battery heater switch 63.

The engine heater switch 61 may receive the engine heater control signal 56. Furthermore, the engine heater switch 61 may control the first amount 60 of energy from the power source 18. Controlling the first amount 60 of energy may include controlling a portion of the first amount 60 transferred from the power source 18 to the engine heater 24 based on the information within the command signal 32 and/or the engine feedback signal 36. In addition, the engine heater 24 may receive the engine heater control signal 56 to change an operative mode of the engine heater 24.

The battery heater switch 63 may receive the battery heater control signal 58. The battery heater switch 63 may be used to control a portion of the second amount 62 of energy transferred from the power source 18 to the battery 14 based on the information within the command signal 32 and/or the battery feedback signal 38. In addition, the battery heater 26 may receive the battery heater control signal 58 to change an operative mode of the battery heater 26.

The operative mode of the at least one heater 22, including the engine heater 24 and/or the battery heater 26, may be either an on or off mode. If the operative mode of the heater 22 is the on mode, then the heater 22 may use energy from the power source 18 to heat the engine 12 and/or the battery 14 of the automotive vehicle 16. The on mode may be either a low on mode, medium on mode, high on mode, or a variable mode of controlling a transfer of energy from the power source 18 to the heater 22. Alternatively, if the operative mode of the heater 22 is the off mode, then the heater 22 may use little or no energy from the power source 18 to heat.

Referring to FIG. 1, the system controller 30 may be configured to receive the demand signal 34 and generate a charging control signal 64 based on the demand signal 34. The charging control signal 64 may control a third amount 66 of energy transferred from the power source 18 to the battery 14. In addition, the system controller 30 may include a battery switch 68. The battery switch 68 may receive the charging control signal 64 to control the third amount 66 of energy. Controlling the third amount 66 of energy may include controlling a portion of the third amount 66 transferred from the power source 18 to the battery 14.

As illustrated in FIG. 1, the system 10 may have an engine heater indicator 70. The engine heater indicator 70 can indicate when power is being transferred from the power source 18 to the engine heater 24. The engine heater indicator 70 may be a light. For example, the light may be a light emitting diode (LED) or set of LEDs. The light may illuminate when power is being transferred to the engine heater 24. Alternatively, the light may illuminate when power is not being transferred. Furthermore, the engine heater indicator 70 may be a gauge or meter. The gauge or meter can measure the first amount 60 of energy transferred from the power source 18 to the engine heater 24. The gauge or meter may also display information indicating how much of the first amount 60 of energy is needed to heat the engine 12, but not yet transferred. Furthermore, the engine heater indicator 70 may be an audible alert or some other suitable indicator to alert a user of the vehicle 16 when power is being transferred to the engine heater 24.

Referring to FIG. 1, the system 10 may include an engine-heater temperature sensor 72 (not illustrated) disposed on the engine heater 24. The engine-heater temperature sensor 72 may sense a temperature of the engine heater 24 and, in response, produce an engine temperature signal 76 having temperature information of the engine 12. Sensing the temperature of the engine heater 24 may be through either conduction, convection, or radiation. For example, the engine-heater temperature sensor 72 may be a thermocouple positioned on the engine heater 24. Based on the temperature sensed by the engine heater 24, the engine-heater temperature sensor 72 may produce the engine temperature signal 76.

As shown in FIG. 1, the system 10 may include an engine temperature sensor 74 to produce the engine temperature signal 76 having temperature information of the engine 12. The engine temperature sensor 74 may sense a temperature of the engine 12. Sensing the temperature of the engine 12 may be through either conduction, convection, or radiation. Based on sensing the temperature of the engine 12, the engine temperature sensor 74 produces the engine temperature signal 76.

As illustrated in FIG. 1, the system 10 may include an engine controller 78. The engine controller 78 may receive the engine temperature signal 76 and generate the engine feedback signal 36 based on the engine temperature signal 76. If the system 10 does not include the engine controller 78, then the engine temperature signal 76 may be the engine feedback signal 36.

In addition, the system 10 may have a battery heater indicator 80. The battery heater indicator 80 can indicate when power is being transferred from the power source 18 to the battery heater 26. Furthermore, the battery heater indicator 80 may be a light. For example, the light may be a light emitting diode (LED) or set of LEDs. The light may illuminate when power is being transferred to the battery heater 26. Alternatively, the light may illuminate when power is not being transferred. The battery heater indicator 80 may be a gauge or meter. The gauge or meter can measure the second amount 62 of energy transferred from the power source 18 to the battery heater 26. The gauge or meter may also display information indicating how much of the second amount 62 of energy is needed to heat the battery 14, but not yet transferred. Furthermore, the battery heater indicator 80 may be an audible alert or some other suitable indicator to alert the user of the vehicle 16 when power is being transferred to the battery heater 26.

Referring to FIG. 1, the system 10 may include a battery-heater temperature sensor 82 (not illustrated) disposed on the battery heater 26. The battery-heater temperature sensor 82 may sense a temperature of the battery heater 26 using either conduction, convection, or radiation. In response to sensing the temperature of the battery heater 26, the battery-heater temperature sensor 82 may produce a battery temperature signal 86 having temperature information of the battery heater 26. For example, the battery-heater temperature sensor 82 may be a thermocouple positioned on the battery heater 26. Based on sensing the temperature of the battery heater 26, the battery-heater temperature sensor 82 may produce the battery temperature signal 86.

As shown in FIG. 1, the system 10 may include a battery temperature sensor 84 to produce the battery temperature signal 86 having temperature information of the battery 14. The battery temperature sensor 84 may sense a temperature of the battery 14. Sensing the temperature of the battery 14 may be through either conduction, convection, or radiation. Based on sensing the temperature of the battery 14, the battery temperature sensor 84 may produce the battery temperature signal 86.

As illustrated in FIG. 1, the system 10 may include a battery controller 88. The battery controller 88 may receive the battery temperature signal 86 and generate the battery feedback signal 38 based on the battery temperature signal 86. If the system 10 does not include the battery controller 88, then the battery temperature signal 86 may be the battery feedback signal 38.

As mentioned above, the heater 22 may be electrically coupled to the power source 18 through the electrical port 130 that is associated with the side view mirror assembly 120 of the automotive vehicle 16.

As generally shown in FIGS. 3-9, the electrical port 130 associated with the side view mirror assembly 120 provides a number of benefits. For example, the electrical port 130 associated with the side view mirror assembly 120 may provide electrical access to the system 10. For example, the electrical port 130 may provide electrical access to the heater 22. Furthermore, this arrangement may reduce complexity and cost of the automotive vehicle 16 because separate sets of body-panel tooling are not necessary if producing alternatively-powered and conventional versions of a vehicle. In addition, this arrangement may reduce bending and/or stooping of a user either connecting the power source 18 to the electrical port 130 or disconnecting the power source 18 from the electrical port 130. Another benefit of the electrical port 130 being associated with the side view mirror assembly 120 includes increasing visibility of the electrical port 130 to a driver of the automotive vehicle 16. Increasing the visibility of the electrical port 130 may help to prevent accidents and safety concerns. For example, increasing the visibility of the electrical port 130 may help to prevent accidental driving of the automotive vehicle 16 when the electrical port 130 is still connected to the power source 18. In addition, increasing the visibility of the electrical port 130 may increase the likelihood that a user may notice a damaged or worn electrical port that needs to be replaced and/or repaired. Other benefits and advantages will be described below in more detail.

Figure 2:
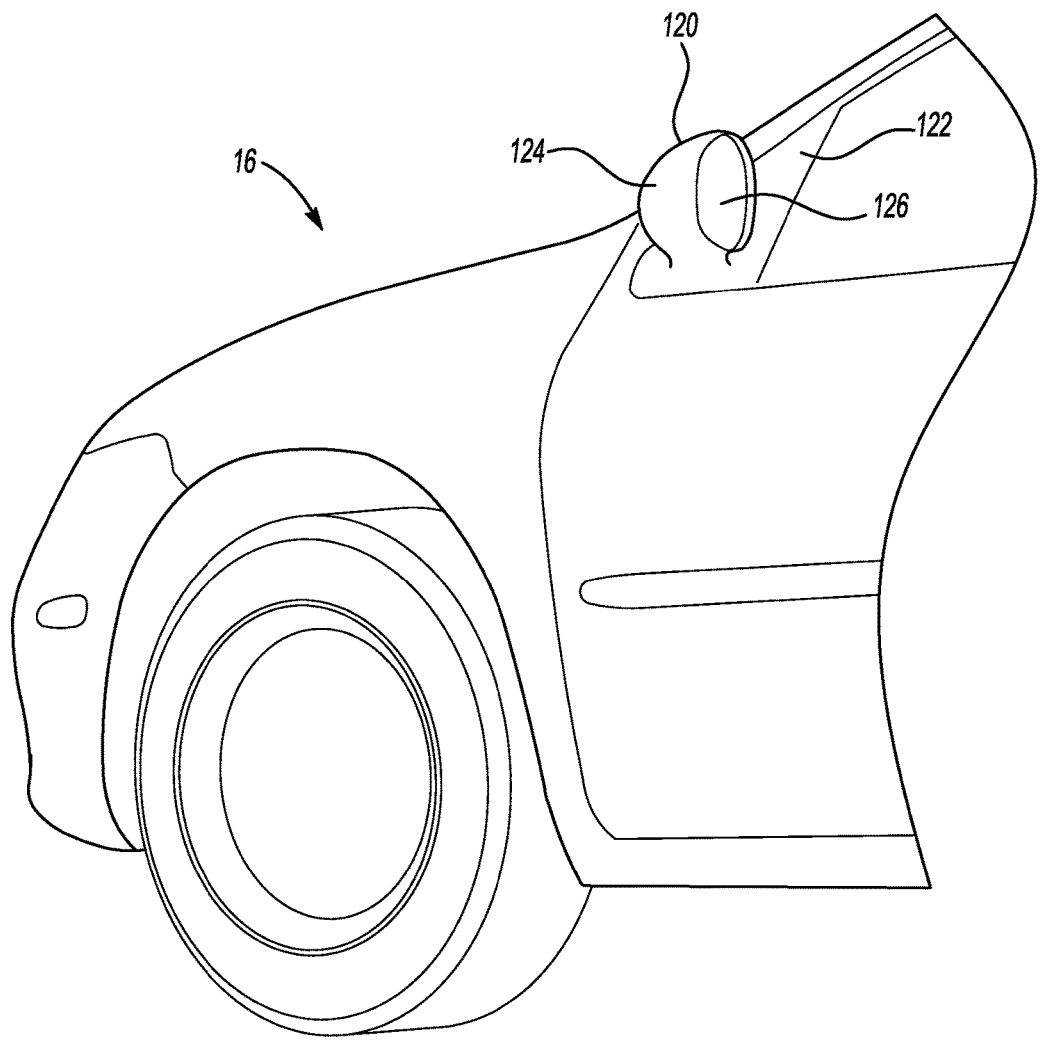
FIG. 2 is a fragmentary side perspective view illustrating a portion of the automotive vehicle.

As illustrated in FIG. 2, the automotive vehicle 16 may include the side view mirror assembly 120. The side view mirror assembly 120 includes a base 122 attached to the automotive vehicle 16, a mirror housing 124 extending from the base 122, and a side view mirror 126. The mirror housing 124 surrounds a rear portion of the side view mirror 126. The mirror housing 124 may provide an aesthetically pleasing appearance for the side view mirror assembly 120. In addition, the mirror housing 124 may protect any mechanisms, such as gearing or motors, configured to move the side view mirror 126 relative to the mirror housing 124. As explained in more detail below, the electrical port 130 (shown in FIGS. 3-9) may be electrically connected to, for example, a residential electrical outlet.

Electromagnetic shielding (not shown) may surround the electrical connection between the electrical port 130 and the system controller 30. The electromagnetic shielding may be a braided, foil or other type of electromagnetic shield material that is integral to the wire and capable of enclosing part or all of the length of the electrical power conductor or electrical signal conductor in the wire. Furthermore, the electromagnetic shielding may take the form of any suitable material and geometry that provides electromagnetic shielding. Electromagnetic shielding can reduce or eliminate unwanted electromagnetic noise radiated from either the electrical power line or electrical signal line in the wire cable to adjacent components. In addition, the electromagnetic shielding can reduce or eliminate the transferring of unwanted externally generated electromagnetic noise to the electrical power line or electrical signal line in the wire cable.

As illustrated in FIG. 3, the mirror housing 124 and mirror 126 may be rotated (as arrow A indicates) from the position shown in phantom line toward the front of the automotive vehicle 16 to expose the electrical port 130. The electrical port 130 may be integrated within a recess 132 of an arm portion 134 of the base 122. Furthermore, the electrical port 130 may be integrated within any suitable portion of the side view mirror assembly 120. When the mirror housing 124 and mirror 126 are in the position shown in phantom line, the mirror housing 124 may conceal the electrical port 130. The mirror housing 124 concealing the electrical port 130 protects the electrical port 130 from environmental debris. When the mirror housing 124 and mirror 126 are in the position shown in solid line, the electrical port 130 is accessible and may be electrically connected to the power source 18 (shown in FIG. 1). As an example, an extension cord may be plugged into a residential power outlet and the electrical port 130 to connect the electrical port 130 to the power source 18.

With continuing reference to FIG. 3, the mirror housing 124 rests atop the arm portion 134. Furthermore, the mirror housing 124 and the mirror 126 may be rotated (as arrow A indicates) about a pivot mechanism (not shown). The pivot mechanism may be connected to the mirror housing 124 and the arm portion 134 to permit the mirror housing 124 to move between various positions, such as those shown in FIG. 3. In other examples gearing, linkages or any other suitable connection may be used to permit the mirror housing 124 to move between the positions as those shown in FIG. 3.

As shown in FIG. 3, the electrical port 130 may be an electrical plug having blades. The electrical plug may be of the male-type and have any number of blades. FIG. 3 illustrates the electrical plug having three blades (male-type). The blades of the electrical plug are configured to receive an electrical socket of a female-type (not shown). The electrical socket may be similar to those sockets found on household extension cords. Alternatively, the electrical port 130 may be an electrical socket or any other suitable female-type electrical connector.

As illustrated in FIGS. 4A-4B, the electrical port 130 may be integrated within the recess 132 of the base 122 of the side view mirror assembly 120. The side view mirror assembly 120 may include a base closure 133. The base closure may be attached to the mirror housing 124. Furthermore, the base closure 133 may be a portion of the arm portion 134 or the arm portion 134 itself. The base closure 133 and the mirror housing 124 may be pivotally connected to the base 122 at pivot P.

As illustrated in FIG. 4A, the base closure 133 may be used to conceal the electrical port 130 and the recess 132. The base closure 133 and the mirror housing 124 may be pivoted from the position depicted in FIG. 4A to the position depicted in FIG. 4B to expose the electrical port 130. Exposing the electrical port 130 allows the electrical port 130 to be electrically connected to the power source 18 (shown in FIG. 1).

Figure 5A:
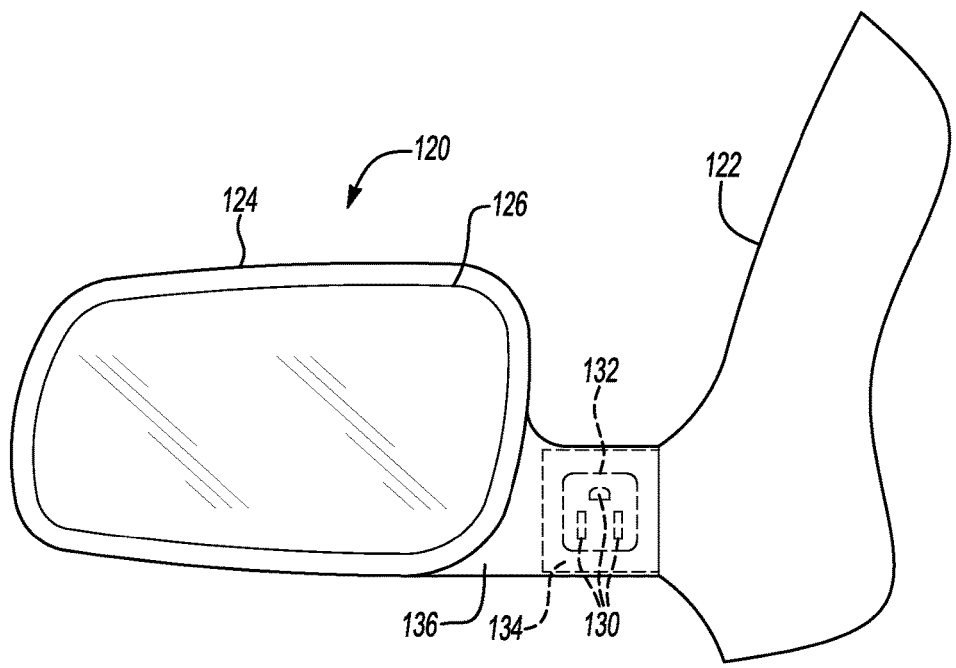
FIG. 5A is a fragmentary rear view illustrating the side view mirror assembly having a slidable sleeve portion concealing the electrical port.
Figure 5B:
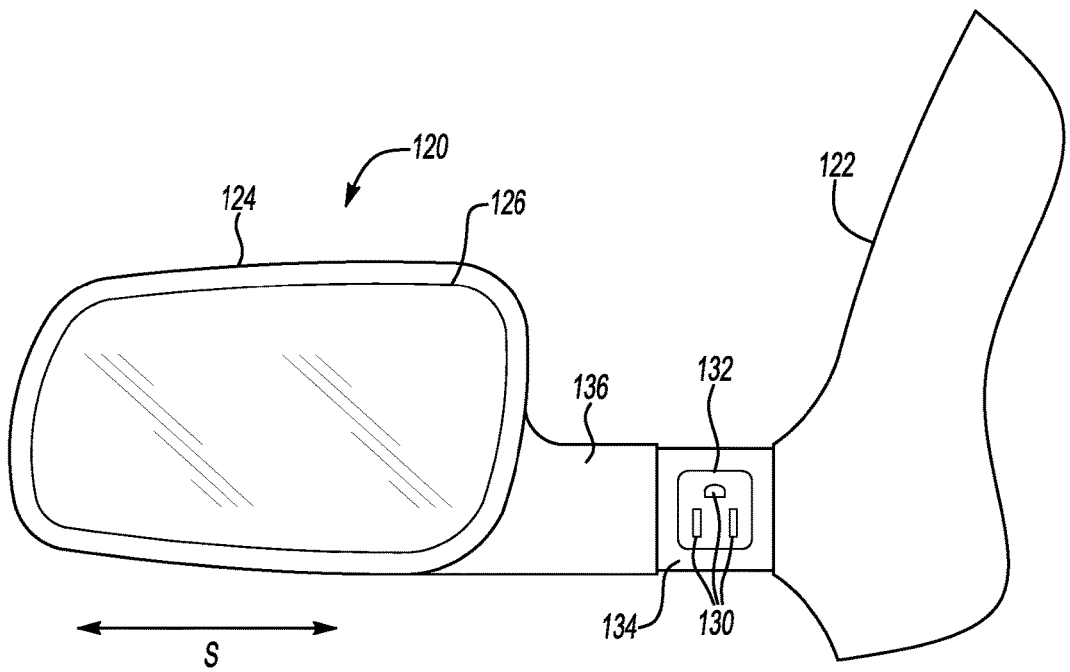
FIG. 5B is a fragmentary rear view illustrating the sleeve portion slid away from its position in FIG. 5A to expose the electrical port.

Referring to FIGS. 5A-5B, the electrical port 130 may be integrated within the recess 132 of the arm portion 134 of the base 122 of the side view mirror assembly 120. In the position shown in FIG. 5A, a sleeve portion 136 of the mirror housing 124 may conceal the electrical port 130 and thus protect the electrical port 130 from environmental debris. The mirror housing 124 and the mirror 126 may be slid (as arrow S indicates) from the position illustrated in FIG. 5A to a position away from the automotive vehicle 16 as illustrated in FIG. 5B to expose the electrical port 130.

Referring to FIGS. 5A-5B, the sleeve portion 136 has a slip fit relationship with the arm portion 134. For example, the slip fit relationship may be a telescopic relationship. Alternatively, any suitable locking or latching mechanism (not shown) may fix the mirror housing 124 in the positions illustrated in FIGS. 5A-5B. As an example, the sleeve portion 136 may include a thumb-actuated latch (not shown) that engages notches (not shown) in the arm portion 134. To move the mirror housing 124 from the position shown in FIG. 5A to that shown in FIG. 5B, a user may pull back on the latch releasing its engagement with one of the notches. The mirror housing 124 may then be slid to the position shown in FIG. 5B where the latch again engages another of the notches. To move the mirror housing 124 from the position shown in FIG. 5B to that shown in FIG. 5A, the above procedure is reversed. Other techniques and mechanisms are also possible.

Figure 6A:
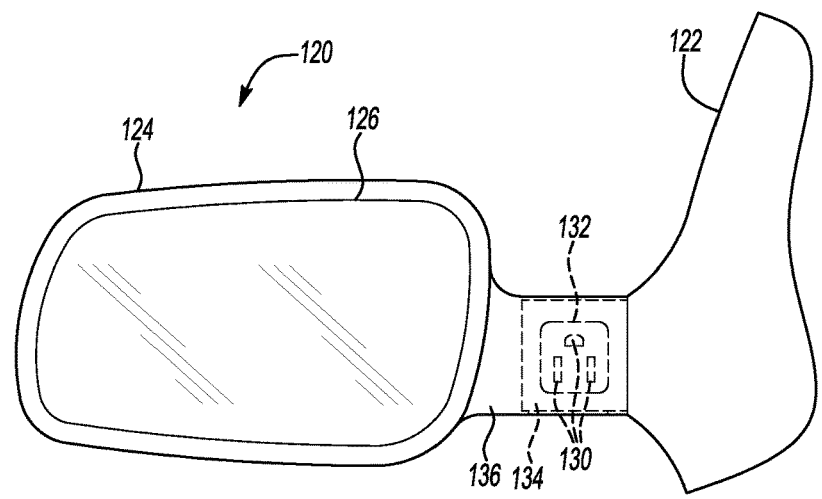
FIG. 6A is a fragmentary rear view illustrating the side view mirror assembly having a rotatable sleeve portion concealing the electrical port.
Figure 6B:
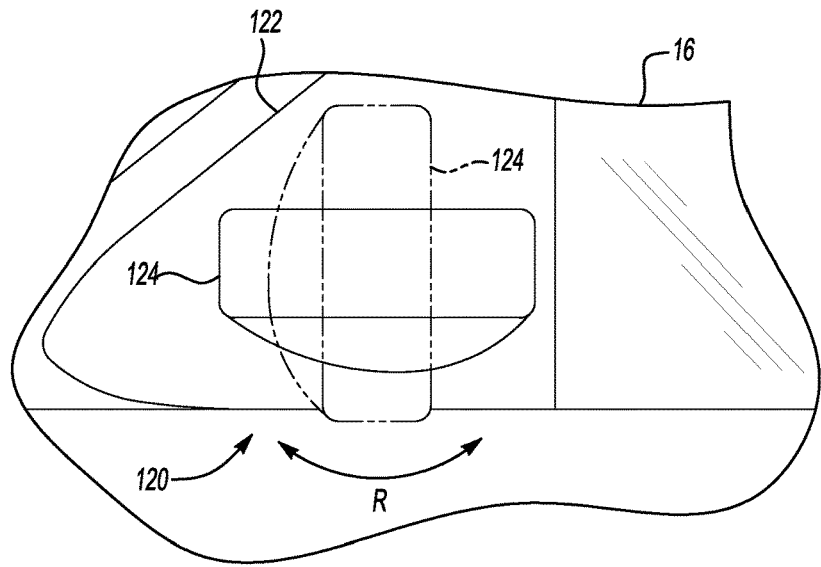
FIG. 6B is a fragmentary side view illustrating the sleeve portion rotated from its position in FIG. 6A to expose the electrical port.
Figure 6C:
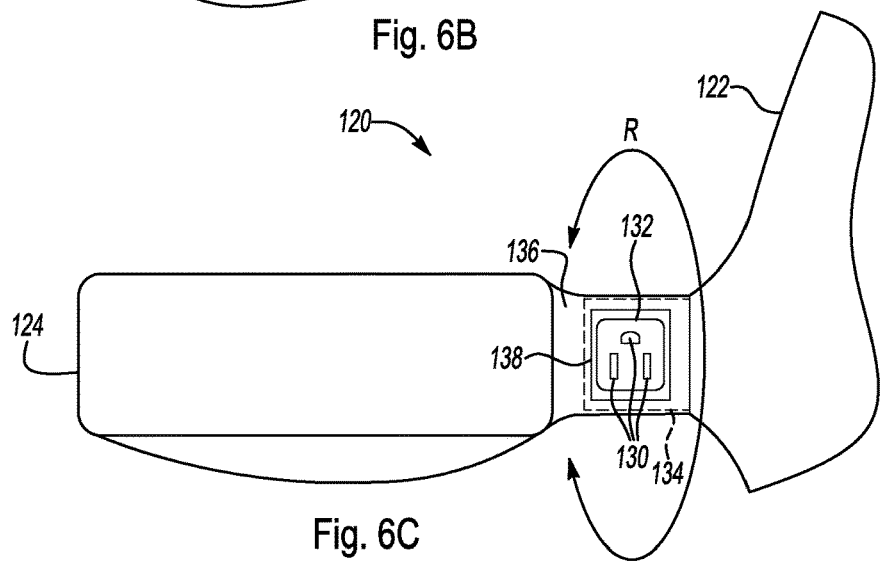
FIG. 6C is a fragmentary rear view illustrating the sleeve portion rotated from its position in FIG. 6A to expose the electrical port.

Referring to FIGS. 6A-6C, the electrical port 130 may be integrated within the recess 132 of the arm portion 134 of the base 122 of the side view mirror assembly 120. In the position shown in FIG. 6A, the sleeve portion 136 of the mirror housing 124 may conceal the electrical port 130 and thus protect the electrical port 130 from environmental debris. The mirror housing 124 may be rotated (as arrow R indicates in FIGS. 6B-6C) between zero degrees (0°) and 180 degrees (180°) either clockwise or counterclockwise. For example, FIG. 6B illustrates that the mirror housing 124 may be rotated approximately 90 degrees counterclockwise from the position shown in phantom line to the position shown in solid line.

Any suitable locking or latching mechanism (not shown) may fix the mirror housing 124 in the positions shown in phantom line and solid line of FIGS. 6A-6C. As an example, the arm portion 134 may include a spring-loaded button (not shown). The sleeve portion 136 (FIG. 6A) may include two openings (not shown) to receive the button. To move the mirror housing 124 from the position shown in phantom line to that shown in solid line, a user may press the button releasing its engagement with one of the openings. The mirror housing 124 may then be rotated to the position shown in solid line where the button again engages the other of the openings. To move the mirror housing 124 from the position shown in solid line to that shown in phantom line, the above procedure is reversed. Other techniques and mechanisms are also possible.

Referring to FIG. 6C, an opening 138 within the bottom of the sleeve portion 136 may be in registration with the recess 132. When the sleeve portion 136 is in registration with the recess 132, the electrical port 130 is accessible.

Figure 7:
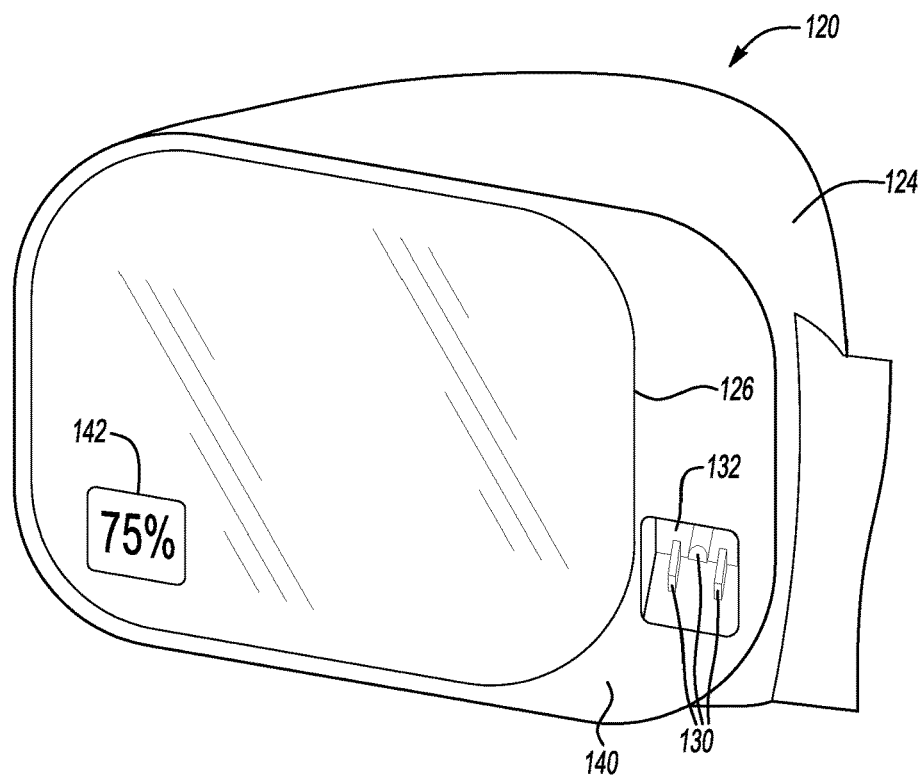
FIG. 7 is a fragmentary rear view illustrating a display and the electrical port within a recess of a face portion of the mirror housing.

Referring to FIG. 7, the electrical port 130 may be integrated within the recess 132 of a face portion 140 of the mirror housing 124 of the side view mirror assembly 120. The electrical port 130 may protrude from the face portion 140 or any other suitable portion of the side view mirror assembly 120. In addition, the electrical port 130 may not reside within a recess formed in the side view mirror assembly 120, but may protrude from the face portion 140.

As illustrated in FIG. 7, the mirror 126 may include a display 142 to display information about the automotive vehicle 16. The display 142 may display information about the electrical power used to charge the battery 14. Furthermore, the display 142 may include the engine heater indicator 70 and/or the battery heater indicator 80 (shown in FIG. 1).

Referring to FIG. 7, the display 142 may indicate the current state of heating of the engine heater 24 and/or the battery heater 26. The display 142 may indicate that the automotive vehicle 16 is connected to/disconnected from the power source 18. In addition, the display 142 may indicate the time required to heat the battery 14, the engine 12, or the battery 14 and the engine 12. Furthermore, the display 142 may indicate when power is being transferred to the engine heater 24 and/or the battery heater 26. Alternatively, the display 142 may indicate when power is not being transferred. In addition, the display 142 may indicate how much of the first amount 60 of energy is needed to heat the engine 12, but not yet transferred. Similarly, the display 142 may indicate how much of the second amount 62 of energy is needed to heat the battery 14, but not yet transferred. Furthermore, the display 142 may indicate the time remaining until the battery 14 is fully charged. Other suitable information may also be displayed. Because the display 142 may be located within a cutaway portion of the mirror 126, the display 142 may be visible from the interior and/or exterior of the automotive vehicle 16. Other locations are also possible.

With reference to FIGS. 1 and 7, the system controller 30 may command the display 142 to display information that the system controller 30 detects. As an example, the system controller 30 may command the display 142 to display a certain pattern indicating that a charging plug is coupled with the electrical port 130. As another example, the system controller 30 may command the display 142 to display a certain pattern indicating that the power factor of the charging power is within a desired range. In other examples, the system controller 30 may command the display 142 to display any suitable information.

With continuing reference to FIG. 7, the display 142 may include a plurality of light emitting diodes (LEDs). The LEDs may be activated to convey information to a person, such as a driver of the automotive vehicle 16. Furthermore, the display 142 may be use either analog or digital technology. In addition, any suitable display technology can be used to display information on the display 142.

Figure 8:
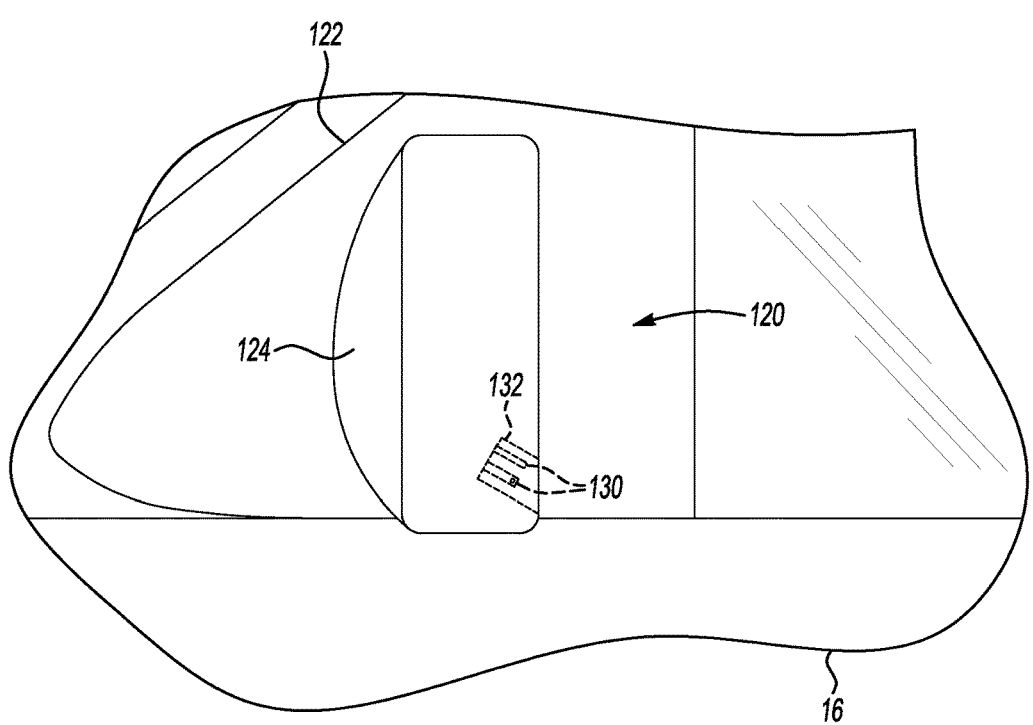
FIG. 8 is a fragmentary side view illustrating the electrical port and the recess angled down from horizontal.

As illustrated in FIG. 8, the recess 132 and the blades of the electrical port 130 may be oriented at an angle with respect to horizontal. For example, the recess 132 and the blades of the electrical port 130 may be oriented at approximately forty degrees (40°) down from horizontal. This angled orientation reduces the amount of debris and moisture accumulated in the recess 132 and on the blades of the electrical port 130. As an example, gravity will act to draw particulate matter and water droplets out from the recess 132. As another example, mud or dirt thrown up from the front tires (not shown) while driving is less likely to lodge within the recess 132 as the opening 138 to the recess 132 faces away from the front tires. In other examples, the electrical port 130 may have a different orientation. As an example, the electrical port 130 may be located on the bottom of the side view mirror assembly 120 and thus face the ground surface, such as a road surface or driveway surface.

Figure 9:
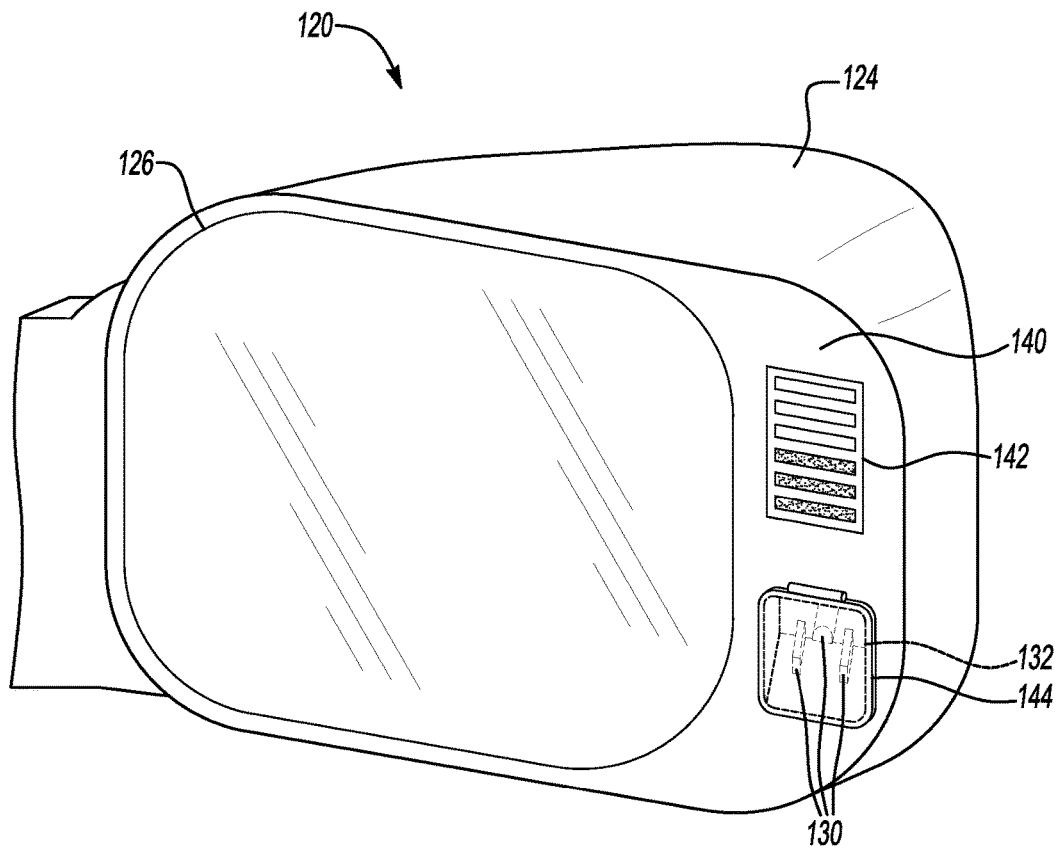
FIG. 9 is a fragmentary rear view illustrating a closure covering the recess.

With reference to FIG. 9, a recess closure 144 may cover at least a portion of the recess 132 to conceal the electrical port 130 within the recess 132. Furthermore, the recess closure 144 may be a hinged plate as illustrated in FIG. 9. A spring may bias the hinged plate against the a portion of the face portion 140 of the mirror housing 124 during driving of the automotive vehicle 16 to prevent debris, moisture, or any other object from entering into the recess 132. The hinged plate 144 may be flipped up to expose the electrical port 130. To conceal the electrical port 130, the hinged plate 144 may be flipped down. Other arrangements are also possible.

The recess closure 144 may be a sliding panel (not shown). To expose the electrical port 130, the sliding panel may be slid in one direction. To conceal the electrical port 130, the sliding panel would be slid in the opposite direction. Furthermore, a spring may bias the sliding panel against the face portion 140 to prevent exposure of the recess 132 during driving of the automotive vehicle 16. In addition, the recess closure 144 may be a press-fit closure, a snap-in closure, a screw cap, or other suitable closure. The recess closure 144 may be tethered to the side view mirror assembly 120 to prevent loss of the recess closure 144. Alternatively, the recess closure 144 may be untethered to the side view mirror assembly 120 to provide mobility and portability of the recess closure 144.

With continuing reference to FIG. 9, the display 142 may be disposed on the face portion 140 of the mirror housing 124 of the side view mirror assembly 120. The display 142 may include a number of individual display bars that illuminate to provide information as described above.

Figure 10:
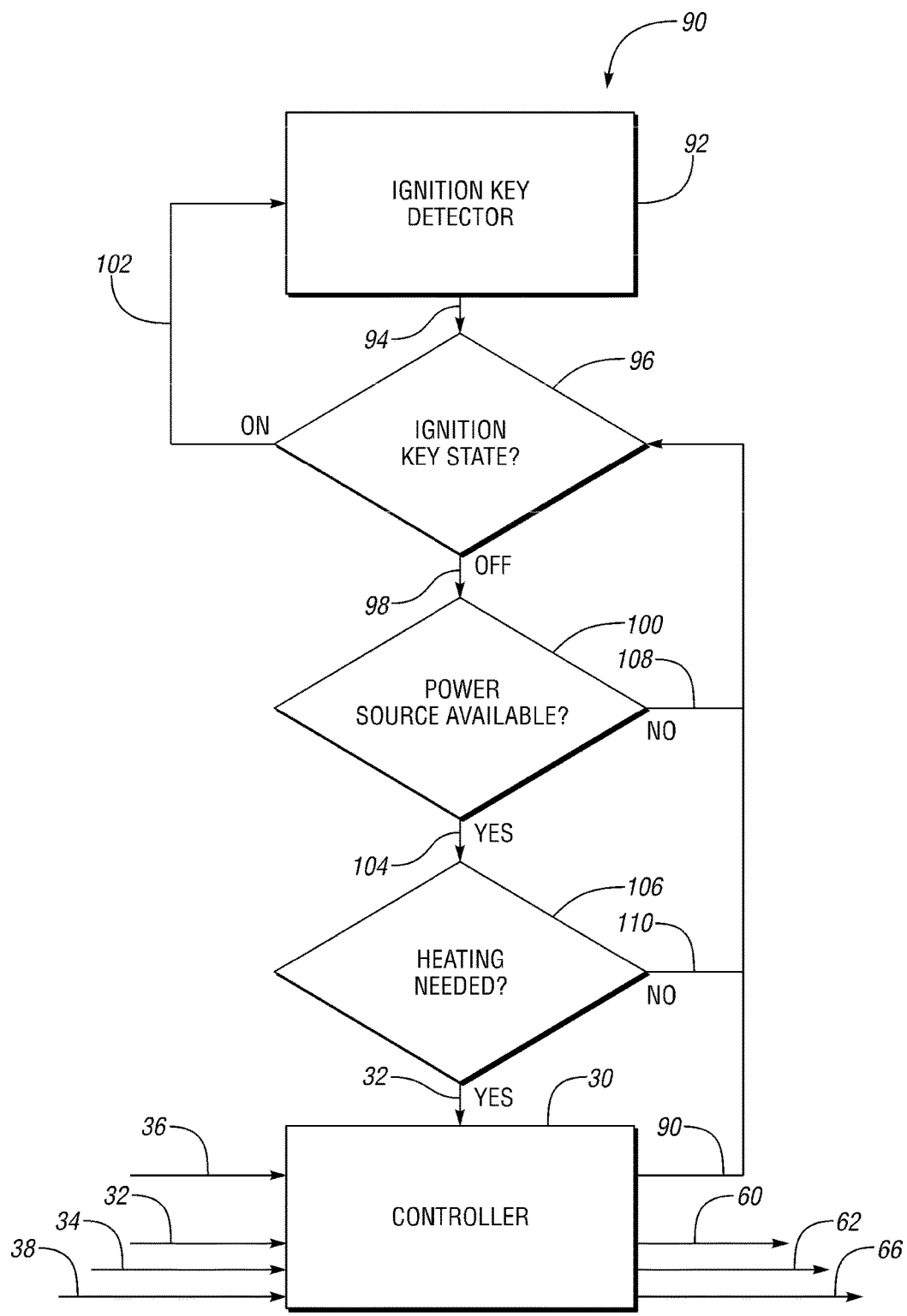
FIG. 10 is a flowchart diagram illustrating a method of controlling heating of at least one of the engine and the battery in the automotive vehicle using the power source external to the vehicle.

With reference to FIG. 10, a method 90 of controlling heating of the engine 12 and/or the battery 14 of the automotive vehicle 16 is illustrated. The automotive vehicle 16 may be the hybrid electric vehicle (HEV) or the plug-in hybrid electric vehicle (PHEV). In block 92, a state of the ignition key is detected and a key state signal 94 is generated. Decision block 96 receives the key state signal 94 and decides the state of the ignition key. If the state of the ignition key is on, then decision block 96 generates an ignition on signal 102 and transmits the ignition on signal 102 to block 92. If the state of the ignition key is off, then decision block 96 generates an ignition off signal 98 and transmits the ignition off signal 98 to decision block 100.

Referring to FIG. 10, decision block 100 receives the ignition off signal 98 and decides if the power source 18 is coupled to the system 10, such as the heater 22 of the system 10. If the power source 18 is coupled to the system 10, then decision block 100 generates a power available signal 104 and transmits the power available signal 104 to decision block 106. If the power source 18 is to be coupled or not coupled to the system 10, then decision block 100 generates a power unavailable signal 108 and transmits the power unavailable signal 108 to decision block 96.

With continuing reference to FIG. 10, decision block 106 receives the power available signal 104 and decides if a temperature of the engine 12 and/or the battery 14 is below a predetermined temperature range or a predetermined temperature. If the temperature of the engine 12 and/or the battery 14 is within the predetermined temperature range or at the predetermined temperature, then decision block 106 generates a heated signal 110 and transmits the heated signal 110 to decision block 96. If the temperature of the engine 12 and/or the battery 14 is below the predetermined temperature range or the predetermined temperature, then decision block 106 generates the command signal 32 and transmits the command signal 32 to the system controller 30.

As illustrated in FIG. 10, the system controller 30 may receive the command signal 32, the engine feedback signal 36, and the battery feedback signal 38. Based on the signals 32, 36, 38, the system controller 30 may generate the engine heater control signal 56 and/or the battery heater control signal 58 (illustrated in FIG. 1). The engine heater control signal 56 may control the first amount 60 of energy transferred from the power source 18 to the engine heater 24 (illustrated in FIG. 1). Similarly, the battery heater control signal 58 may control the second amount 62 of energy transferred from the power source 18 to the battery heater 26 (illustrated in FIG. 1).

The method 90 of controlling heating of the engine 12 of the automotive vehicle 16 may include: receiving the first amount 60 of energy from the power source 18 that is external to the vehicle 16; heating the engine 12 using the engine heater 24; sensing the temperature of the engine 12 using the engine temperature sensor 74; and transmitting the engine feedback signal 36 based on the temperature of the engine 12.

The method 90 of controlling heating of the battery 14 of the automotive vehicle 16 may include: receiving the second amount 62 of energy from the power source 18 that is external to the vehicle 16; heating the battery 14 using the battery heater 26; sensing the temperature of the battery 14 using the battery temperature sensor 84; and transmitting the battery feedback signal 38 based on the temperature of the battery 14.

In addition, the method 90 of controlling heating at least one of the engine 12 and the battery 14 may include: receiving the demand signal 34; generating the charging control signal 64 based on the demand signal 34; receiving the third amount 66 of energy from the power source 18; controlling the third amount 66 of energy transferred from the power source 18 to the battery 14 of the automotive vehicle 16; and charging the battery 14.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A system for controlling heating of a battery in a hybrid vehicle using a power source external to the vehicle, the system comprising:
   a battery heater, located in the vehicle and electrically coupled to an electrical port; and
   a system controller in the vehicle configured to generate a heater control signal based on battery-life information and to distribute electric power from the power source to the battery heater.

2. The system as in claim 1 wherein the system controller receives a demand signal and generates a charging control signal based on the demand signal to control electric energy transferred from the electrical port to the battery.

3. The system as in claim 2 wherein the system controller has a battery switch that receives the charging control signal to control the electric energy transferred to the battery.

4. The system as in claim 1 wherein the system includes an occupant controller to provide user setting information wherein the system controller generates the heater control signal based on the user setting information.

5. The system as in claim 1 wherein the system controller has a clock to measure a time interval and wherein the system controller is configured to generate the heater control signal after the time interval exceeds a predetermined amount of time to control an amount of energy transferred to the battery heater.

6. The system as in claim 1 wherein the system includes an occupant controller configured to transmit user setting information to the system controller based on a user configuration of the occupant controller, the system controller being configured to generate the heater control signal based on the user setting information.

7. The system as in claim 1 wherein the system further includes an indicator configured to indicate when power is being transferred from the power source to the battery heater.

8. The system as in claim 1 wherein the system controller is further configured to receive a feedback signal and generate the heater control signal based on the feedback signal.

9. The system as in claim 8 wherein the system further includes a temperature sensor configured to produce a temperature signal having temperature information of the battery.

10. The system as in claim 9 wherein the system controller is further configured to generate the heater control signal to heat and maintain the battery within a predetermined temperature range based on the temperature signal.

11. The system as in claim 9 wherein the system controller is further configured to generate the heater control signal to heat the battery to a predetermined temperature based on the temperature signal.

12. The system as in claim 11 wherein the system includes a battery controller configured to receive the temperature signal and generate the feedback signal based at least in part on the temperature signal.

13. A system for controlling heating of a battery in a hybrid electric vehicle using a power source external to the vehicle, the system comprising:
an electrical port integrated in the hybrid vehicle and configured to receive electric power from the power source;
a heater in the hybrid electric vehicle electrically coupled to the electrical port and configured to heat the battery;
a temperature sensor in the hybrid electric vehicle;
a system controller in the hybrid electric vehicle configured to receive a command signal and a feedback signal including battery-life information and to generate a heater control signal based on the command signal and the feedback signal to control distribution of electric power from the power source between charging the battery and the heater;
a heater switch configured to receive the heater control signal to control an amount of energy transferred from the power source to the heater to heat the battery to a predetermined temperature and to maintain the battery within a predetermined temperature range; and
a battery controller configured to receive a temperature signal from the temperature sensor and generate the feedback signal based in part on the temperature signal.

14. The system as in claim 13 wherein the system controller is configured to receive a demand signal and generate a charging control signal based on the demand signal to control power transferred from the power source to the battery thereby changing the electric power distribution between charging the battery and the heater.

15. A method of controlling heating of at a battery in a hybrid vehicle using a power source external to the vehicle, the method comprising:
receiving a command signal and a feedback signal that includes battery-life information;
generating a heater control signal based on the command signal and the feedback signal;
controlling electric power distribution between charging the battery and a battery heater;
receiving an amount of energy from the power source external to the vehicle; and
controlling the amount of energy transferred from the power source to the battery heater based on the heater control signal.

16. The method as in claim 15 wherein the method includes:
receiving a demand signal for charging the battery;
generating a charging control signal based on the demand signal;
receiving electric power from the power source;
controlling the electric power transferred from the power source to the battery of the hybrid vehicle to change an electric power distribution between charging the battery and the battery heater; and
charging the battery.

* * * * *